United States Patent
Zhai et al.

(10) Patent No.: US 10,056,781 B2
(45) Date of Patent: Aug. 21, 2018

(54) POWER CARRIER SIGNAL COUPLING CIRCUIT AND COMMUNICATION SYSTEM

(71) Applicant: SUNGROW POWER SUPPLY CO., LTD., Hefei, Anhui (CN)

(72) Inventors: Jiwen Zhai, Anhui (CN); Yunhai Dai, Anhui (CN); Liangshu Fang, Anhui (CN); Zhuqing Hao, Anhui (CN); Yanfen Chang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 15/608,443

(22) Filed: May 30, 2017

(65) Prior Publication Data

US 2018/0062429 A1 Mar. 1, 2018

(30) Foreign Application Priority Data

Aug. 29, 2016 (CN) .......................... 2016 1 0756781

(51) Int. Cl.
*H02J 13/00* (2006.01)
*H04B 3/56* (2006.01)
*H04L 12/28* (2006.01)

(52) U.S. Cl.
CPC ............ *H02J 13/0034* (2013.01); *H04B 3/56* (2013.01); *H04L 12/2803* (2013.01); *H04L 12/2838* (2013.01); *H04B 2203/5437* (2013.01); *H04B 2203/5445* (2013.01); *H04B 2203/5466* (2013.01); *H04B 2203/5483* (2013.01)

(58) Field of Classification Search
CPC ............ H02J 13/0034; H04L 12/2838; H04L 12/2803; H04B 3/56; H04B 2203/5437; H04B 2203/5445; H04B 2203/5483; H04B 2203/5466
See application file for complete search history.

(56) References Cited

U.S. PATENT DOCUMENTS 4,616,286 A * 10/1986 Breece ................. H03H 1/0007
361/111
5,805,053 A * 9/1998 Patel ......................... H04B 3/56
340/12.33

(Continued)

OTHER PUBLICATIONS

Extended European Search Report corresponding to Application No. 17173412.21-1875; dated Jul. 21, 2017.

*Primary Examiner* — Babar Sarwar
(74) *Attorney, Agent, or Firm* — Cantor Colburn LLP

(57) ABSTRACT

Provided are a power carrier signal coupling circuit and a communication system. The power carrier signal coupling circuit includes a first power carrier signal coupling channel and a second power carrier signal coupling channel. A phase of a three-phase alternating current (AC) power line serves as a common channel, the first power carrier signal coupling channel is arranged between the common channel and one of two phases of the three-phase AC power line other than the phase of the three-phase AC power line serving as the common channel; and the second power carrier signal coupling channel is arranged between the common channel and the other of the two phases of the three-phase AC power line other than the phase of the three-phase AC power line serving as the common channel.

14 Claims, 4 Drawing Sheets

(56) References Cited

U.S. PATENT DOCUMENTS

| | | | | |
|---|---|---|---|---|
| 6,297,729 | B1* | 10/2001 | Abali | H04B 3/542 |
| | | | | 340/12.34 |
| 6,690,283 | B2* | 2/2004 | Nemoto | H02H 3/048 |
| | | | | 340/659 |
| 8,405,341 | B2* | 3/2013 | Tagome | H02K 3/28 |
| | | | | 318/254.1 |
| 9,736,911 | B2* | 8/2017 | Taipale | H05B 37/0263 |
| 2006/0262881 | A1* | 11/2006 | Cern | H04B 3/56 |
| | | | | 375/300 |
| 2009/0066271 | A1* | 3/2009 | Kajouke | H02M 7/5387 |
| | | | | 318/139 |
| 2009/0134706 | A1* | 5/2009 | Kuo | H02J 3/46 |
| | | | | 307/80 |
| 2015/0372610 | A1* | 12/2015 | Ichiki | H02M 5/293 |
| | | | | 363/163 |
| 2016/0118925 | A1* | 4/2016 | Kim | B60L 7/14 |
| | | | | 318/139 |
| 2017/0084414 | A1* | 3/2017 | Rozman | H01H 83/02 |

\* cited by examiner

POWER CARRIER SIGNAL COUPLING CIRCUIT AND COMMUNICATION SYSTEM

CROSS REFERENCE TO RELATED APPLICATION

The present invention claims priority under 35 U.S.C. § 119 to Chinese Patent Application No. 201610756781.6, titled "POWER CARRIER SIGNAL COUPLING CIRCUIT AND COMMUNICATION SYSTEM", filed on Aug. 29, 2016 with the State Intellectual Property Office of the PRC, which is incorporated herein by reference in its entirety.

FIELD

The present disclosure relates to the technical field of power carrier communication, and in particular to a power carrier signal coupling circuit and a communication system.

BACKGROUND

Power line Communication (PLC) becomes a preferred communication method in communication network of power system since a distribution network has rich user resources and economic efficiency.

However, a power line channel is not an ideal channel. This is because the power line has a low reliability, due to serious noise interference on the power line, changeful load situations for the power line and channel parameters affected by time, location, frequency and a device connected to the power line.

In order to improve the reliability, in a method according to conventional technologies, a master device and a slave device for power line carrier are connected in parallel via an inductor or capacitor and coupled between a three-phase line and a zero line. In this method, three groups of coupling circuits or devices are needed, hence the installation is complicated and the cost is high.

In another method, carrier signals with different frequencies are respectively coupled to three phases to transmit data. Multiple carrier signals are modulated by multiple modulation circuits to generate balanced three-phase power line carrier signals including a first phase signal, a second phase signal and a third phase signal, and the balanced three-phase power line carrier signals are coupled into the three-phase power line. In this method, multiple carrier modulation circuits and receiving devices are needed, hence the cost is also high.

SUMMARY

The main object of the present disclosure is to provide a power carrier signal coupling circuit to improve the reliability of power carrier communication and reduce the cost of the power carrier communication In order to achieve the above objective, it is provided a power carrier signal coupling circuit according to the present disclosure. The power carrier signal coupling circuit includes a first power carrier signal coupling channel and a second power carrier signal coupling channel. And a phase of a three-phase alternating current (AC) power line serves as a common channel, the first power carrier signal coupling channel is arranged between the common channel and one of two phases of the three-phase AC power line other than the phase of the three-phase AC power line serving as the common channel, and the second power carrier signal coupling channel is arranged between the common channel and the other of the two phases of the three-phase AC power line other than the phase of the three-phase AC power line serving as the common channel.

Preferably, the power carrier signal coupling circuit further includes a coupling transformer and a signal transceiver. A primary side of the coupling transformer is connected to the first power carrier signal coupling channel and the second power carrier signal coupling channel, and a secondary side of the coupling transformer is connected to the signal transceiver.

Preferably, the first power carrier signal coupling channel includes a first capacitor, the second power carrier signal coupling channel includes a second capacitor, the coupling transformer includes a primary winding, a first secondary winding and a second secondary winding, a first terminal of the first secondary winding is connected to the signal transceiver, a second terminal of the first secondary winding is connected to a first terminal of the second secondary winding and a second terminal of the second secondary winding is connected to the signal transceiver; and a first terminal of the first capacitor is connected to one of the two phases of the three-phase AC power line other than the phase of the three-phase AC power line serving as the common channel, a second terminal of the first capacitor is connected to a first terminal of the primary winding, a first terminal of the second capacitor is connected to the other of the two phases of the three-phase AC power line other than the phase of the three-phase AC power line serving as the common channel, a second terminal of the second capacitor is connected to the first terminal of the primary winding, and a second terminal of the primary winding is connected to the common channel.

Preferably, the power carrier signal coupling circuit further includes a first transient voltage suppressor diode, with an A phase of the three-phase AC power line serving as the common channel, where the first power carrier signal coupling channel is arranged between the A phase of the three-phase AC power line and a B phase of the three-phase AC power line, the second power carrier signal coupling channel is arranged between the A phase of the three-phase AC power line and a C phase of the three-phase AC power line, a cathode of the first transient voltage suppressor diode is connected to the A phase of the three-phase AC power line, and an anode of the first transient voltage suppressor diode is connected to the B phase and the C phase of the three-phase AC power line.

Preferably, the power carrier signal coupling circuit further includes a first transient voltage suppressor diode, with a B phase of the three-phase AC power line serving as the common channel, where the first power carrier signal coupling channel is arranged between the B phase of the three-phase AC power line and an A phase of the three-phase AC power line, the second power carrier signal coupling channel is arranged between the B phase of the three-phase AC power line and a C phase of the three-phase AC power line, a cathode of the first transient voltage suppressor diode is connected to the B phase of the three-phase AC power line, and an anode of the first transient voltage suppressor diode is connected to the A phase and the C phase of the three-phase AC power line.

Preferably, the power carrier signal coupling circuit further includes a first transient voltage suppressor diode, with a C phase of the three-phase AC power line serving as the common channel, where the first power carrier signal coupling channel is arranged between the C phase of the three-phase AC power line and an A phase of the three-phase AC power line, the second power carrier signal coupling channel is arranged between the C phase of the three-phase AC power line and a B phase of the three-phase AC power line, a cathode of the first transient voltage suppressor diode is connected to the C phase of the three-phase AC power line, and an anode of the first transient voltage suppressor diode is connected to the A phase and the B phase of the three-phase AC power line.

Preferably, the signal transceiver includes a bandpass filtering circuit, the bandpass filtering circuit includes a first resistor, a second resistor, a third capacitor and a fourth capacitor, a first terminal of the third capacitor is connected to the first terminal of the first secondary winding and a second terminal of the third capacitor is grounded via the first resistor, and a second terminal of the fourth capacitor is connected to the second terminal of the second secondary winding and a second terminal of the fourth capacitor is grounded via the second resistor.

Preferably, the signal transceiver further includes a second transient voltage suppressor diode and a third transient voltage suppressor diode, and the signal transceiver further includes a first signal terminal, a second signal terminal and a power terminal;

the first signal terminal of the signal transceiver is connected to the first terminal of the first secondary winding, the second signal terminal of the signal transceiver is connected to the second terminal of the second secondary winding, and the power terminal of the signal transceiver is connected to a common point between the first secondary winding and the second secondary winding; and a cathode of the second transient voltage suppressor diode is connected to the first signal terminal of the signal transceiver and an anode of the second transient voltage suppressor diode is grounded, and a cathode of the third transient voltage suppressor diode is connected to the second signal terminal of the signal transceiver and an anode of the third transient voltage suppressor diode is grounded.

Preferably, a power level is outputted via a power terminal of the signal transceiver when the signal transceiver sends a signal via a first signal terminal and a second signal terminal.

It is further provided a communication system according to the present disclosure, the communication system includes the power carrier signal coupling circuit as described in the above. The power carrier signal coupling circuit includes the first power carrier signal coupling channel and the second power carrier signal coupling channel. A phase of the three-phase AC power line serves as the common channel. The first power carrier signal coupling channel is arranged between the common channel and one of the two phases of the three-phase AC power line other than the phase of the three-phase AC power line serving as the common channel, and the second power carrier signal coupling channel is arranged between the common channel and the other of the two phases of the three-phase AC power line other than the phase of the three-phase AC power line serving as the common channel.

In the technical solutions according to the present disclosure, a power carrier signal is coupled into the first power carrier signal coupling channel and the second power carrier signal coupling channel by a slave device. A master device may be connected to any two phases of the three-phase AC power line, and the power carrier signal can be received by at least one phase, thereby extremely reducing the cost and installation complexity. Meanwhile, if an interference signal on a channel is large, the master device may receive data via another signal channel. Therefore, it is avoided a problem that information can not be transmitted due to interference in a case that data is transmitted in a single channel.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

REFERENCE NUMERALS ARE DESCRIBED AS FOLLOWS

Figure 1:
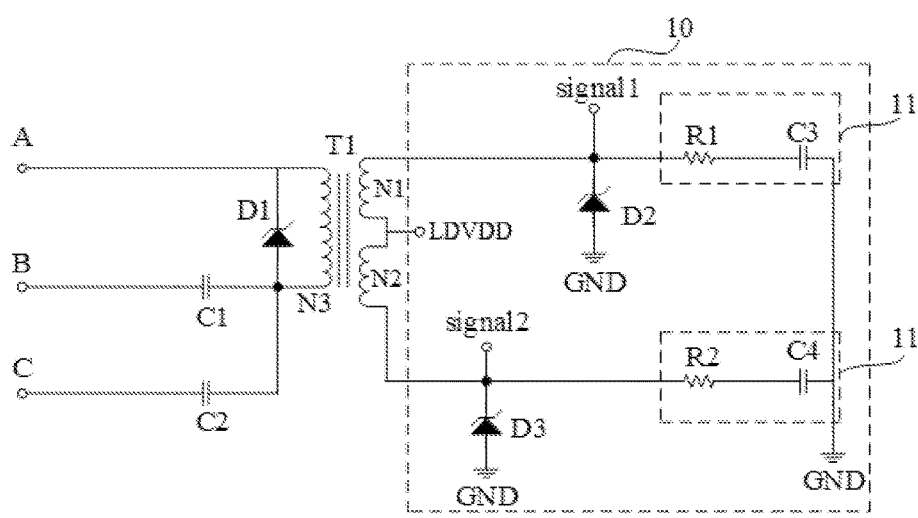
FIG. 1 is a schematic structural diagram of a power carrier signal coupling circuit according to an embodiment of the present disclosure.
Figure 2:
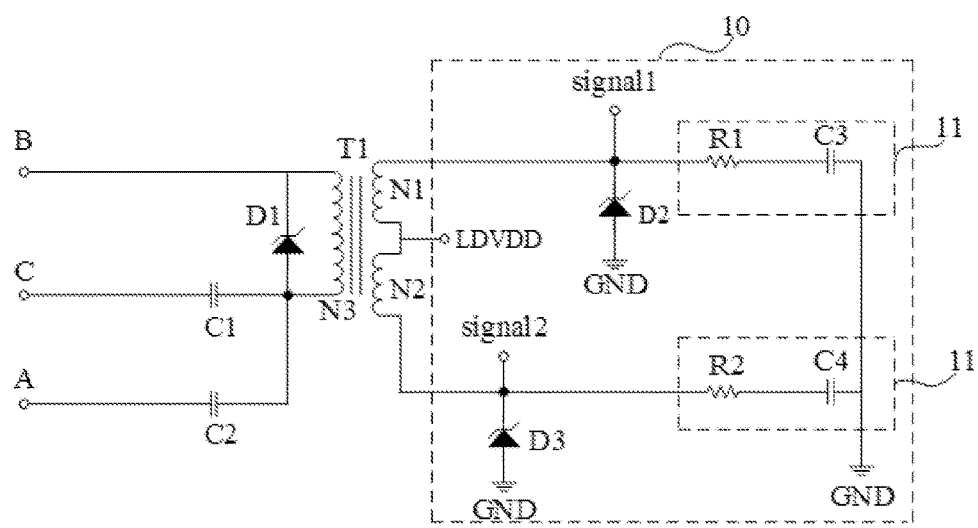
FIG. 2 is a schematic structural diagram of a power carrier signal coupling circuit according to another embodiment of the present disclosure.
Figure 3:
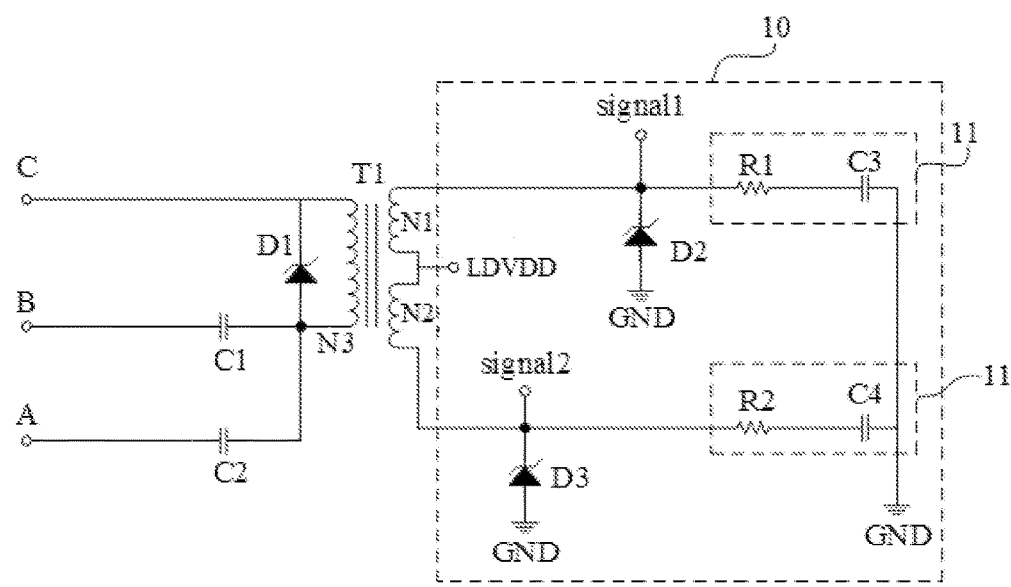
FIG. 3 is a schematic structural diagram of a power carrier signal coupling circuit according to yet another embodiment of the present disclosure.

| Reference numerals | Name | Reference numerals | Name |
|---|---|---|---|
| R1 | First resistor | C4 | Fourth capacitor |
| R2 | Second resistor | T1 | Coupling transformer |
| C1 | First capacitor | D1 | First transient voltage suppressor diode |
| C2 | Second capacitor | D2 | Second transient voltage suppressor diode |
| C3 | Third capacitor | D3 | Third transient voltage suppressor diode |
| 10 | Signal transceiver | 11 | Bandpass filter |

The implementations, function features and advantages of the present disclosure are further described in conjunction with embodiments by referring to the drawings.

DETAILED DESCRIPTION OF EMBODIMENTS

The technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the protection scope of the present disclosure.

It should be noted that, all directional indications in the embodiments of the present disclosure (such as up, down, left, right, front and back) are only used for illustrating a relative position relationship between parts, motion situations of the parts and the like under a certain attitude (as shown in the figure). In a case that the certain attitude changes, the directional indications should change correspondingly.

In addition, the terms such as "first" and "second" in the present disclosure are only for description, and can not be considered to indicate or imply relative importance of technical features indicated by the "first" and "second" or impliedly specify the number of the technical features indicated by the "first" and "second". Therefore, features indicated by "first" and "second" may explicitly or impliedly include at least one of the features. Besides, technical solutions of the embodiments may be combined with one another to obtain a technical solution which can be implemented by those skilled in the art. In the case that the newly combined technical solution has conflicts or can not be implemented, it should be considered that the technical solution neither exists nor falls within the scope of protection claimed by the present disclosure.

It is provided a power carrier signal coupling circuit according to the present disclosure. Reference is made to FIG. 1. In an embodiment of the present disclosure, the power carrier signal coupling circuit includes a first power carrier signal coupling channel (not shown) and a second power carrier signal coupling channel (not shown). A phase of a three-phase alternating current (AC) power line serves as a common channel. The first power carrier signal coupling channel is arranged between the common channel and one of two phases of the three-phase AC power line other than the phase of the three-phase AC power line serving as the common channel, and the second power carrier signal coupling channel is arranged between the common channel and the other of the two phases of the three-phase AC power line other than the phase of the three-phase AC power line serving as the common channel.

It should be noted that, the power carrier signal coupling circuit is applied in a three-phase power line without N line which can not only receive but also send a power carrier signal. In an actual application, one master device and at least one slave device are included. The power carrier signal coupling circuit is arranged in each of the master device and the slave device. The slave device sends a power carrier signal via the first power carrier signal coupling channel and the second power carrier signal coupling channel. After being transmitted in an electric cable, the power carrier signal is received by the master device via the first power carrier signal coupling channel and/or the second power carrier signal coupling channel. In addition, the case where the master device sends a signal to the slave device is similar to the case that the slave device sends a signal to the master device.

In the technical solution according to the present disclosure, a power carrier signal is coupled into the first power carrier signal coupling channel and the second power carrier signal coupling channel by a slave device. A master device may be connected to any two phases of the three-phase AC power line, and the power carrier signal can be received by at least one phase, thereby extremely reducing the cost and installation complexity. Meanwhile, if an interference signal on a channel is large, the master device may receive data via another signal channel. Therefore, it is avoided a problem that information can not be transmitted due to interference in a case that data is transmitted in a single channel.

Further, the power carrier signal coupling circuit further includes a coupling transformer T1 and a signal transceiver 10. A primary side of the coupling transformer T1 is connected to the first power carrier signal coupling channel and the second power carrier signal coupling channel, and a secondary side of the coupling transformer T1 is connected to the signal transceiver 10.

A voltage in an electric cable is generally up to several kilovolts even several tens of kilovolts, while an operation voltage in the signal transceiver 10 is generally a low voltage. In this case, the coupling transformer T1 is configured to isolate a high voltage from a low voltage, thereby effectively preventing a low-voltage device from being damaged by a high voltage. And the signal transceiver 10 is configured to perform modulation, demodulation and related processing.

Further, the first power carrier signal coupling channel includes a first capacitor C1, and the second power carrier signal coupling channel includes a second capacitor C2. The coupling transformer T1 includes a primary winding N3, a first secondary winding N1 and a second secondary winding N2. A first terminal of the first secondary winding N1 is connected to the signal transceiver 10, a second terminal of the first secondary winding N1 is connected to a first terminal of the second secondary winding N2, and a second terminal of the second secondary winding N2 is connected to the signal transceiver 10.

A first terminal of the first capacitor C1 is connected to one of two phases of the three-phase AC power line other than the phase of the three-phase AC power line serving as the common channel and a second terminal of the first capacitor C1 is connected to a first terminal of the primary winding N3. A first terminal of the second capacitor C2 is connected to the other of the two phases of the three-phase AC power line other than the phase of the three-phase AC power line serving as the common channel and a second terminal of the second capacitor C2 is connected to the first terminal of the primary winding N3. And a second terminal of the primary winding N3 is connected to the common channel.

It should be noted that, both the first capacitor C1 and the second capacitor C2 are coupling capacitors, and each of the first capacitor C1 and the second capacitor C2 forms a LC resonant circuit with the primary winding N3 of the coupling transformer T1, to filter out interference caused by a low frequency fundamental signal.

Because different phases may serve as the common channel, the power carrier signal coupling circuit may be implemented by following three embodiments.

In an embodiment, the power carrier signal coupling circuit includes a first transient voltage suppressor diode D1, with an A phase of the three-phase AC power line serving as the common channel. The first power carrier signal coupling channel is arranged between the A phase of the three-phase AC power line and a B phase of the three-phase AC power line, and the second power carrier signal coupling channel is arranged between the A phase of the three-phase AC power line and a C phase of the three-phase AC power line. A cathode of the first transient voltage suppressor diode D1 is connected to the A phase of the three-phase AC power line, and an anode of the first transient voltage suppressor diode D1 is connected to the B phase and the C phase of the three-phase AC power line.

In another embodiment, the power carrier signal coupling circuit further includes a first transient voltage suppressor diode D1, with a B phase of the three-phase AC power line serving as the common channel. The first power carrier signal coupling channel is arranged between the B phase of the three-phase AC power line and an A phase of the three-phase AC power line, and the second power carrier signal coupling channel is arranged between the B phase of the three-phase AC power line and a C phase of the three-phase AC power line. A cathode of the first transient voltage suppressor diode D1 is connected to the B phase of the three-phase AC power line, and an anode of the first transient voltage suppressor diode D1 is connected to the A phase and the C phase of the three-phase AC power line.

In yet another embodiment, the power carrier signal coupling circuit further includes a first transient voltage suppressor diode D1, with a C phase of the three-phase AC power line serving as the common channel. The first power carrier signal coupling channel is arranged between the C phase of the three-phase AC power line and an A phase of the three-phase AC power line, and the second power carrier signal coupling channel is arranged between the C phase of the three-phase AC power line and a B phase of the three-phase AC power line. A cathode of the first transient voltage suppressor diode D1 is connected to the C phase of the three-phase AC power line, and an anode of the first transient voltage suppressor diode D1 is connected to the A phase and the B phase of the three-phase AC power line.

The first transient voltage suppressor diode D1 is configured to suppress instantaneous overvoltage between phases to prevent the coupling transformer T1 or other electronic elements which are not voltage withstanding from being burnt out.

Further, the signal transceiver 10 includes a bandpass filtering circuit. The bandpass filtering circuit includes a first resistor R1, a second resistor R2, a third capacitor C3 and a fourth capacitor C4. A first terminal of the third capacitor C3 is connected to the first terminal of the first secondary winding N1 and a second terminal of the third capacitor C3 is grounded via the first resistor R1. A second terminal of the fourth capacitor C4 is connected to the second terminal of the second secondary winding N2 and a second terminal of the fourth capacitor C4 is grounded via the second resistor R2.

The first resistor R1 and the third capacitor C3 form a bandpass filter, and the second resistor R2 and the fourth capacitor C4 form a bandpass filter. The bandpass filters are configured to prevent the master device and the slave device from pulse noise interference brought at the instant of grid-connection. In the embodiment, the bandpass filter has no attenuation on a signal with a frequency ranging from 10 kHz to 1 MHz, and effectively suppresses a signal with a frequency out of a band for a power line carrier communication.

Further, the signal transceiver 10 further includes a second transient voltage suppressor diode D2 and a third transient voltage suppressor diode D3. And the signal transceiver 10 includes a first signal terminal signal1, a second signal terminal signal2 and a power terminal LDVDD.

The first signal terminal signal1 of the signal transceiver 10 is connected to the first terminal of the first secondary winding N1. The second signal terminal signal2 of the signal transceiver 10 is connected to the second terminal of the second secondary winding N2. And the power terminal LDVDD of the signal transceiver 10 is connected to a common point between the first secondary winding N1 and the second secondary winding N2.

A cathode of the second transient voltage suppressor diode D2 is connected to the first signal terminal signal1 of the signal transceiver 10, and an anode of the second transient voltage suppressor diode D2 is grounded. A cathode of the third transient voltage suppressor diode D3 is connected to the second signal terminal signal2 of the signal transceiver 10, and an anode of the third transient voltage suppressor diode D3 is grounded.

The second transient voltage suppressor diode D2 and the third transient voltage suppressor diode D3 are also configured to suppress an instantaneous high voltage to prevent a low voltage element from being damaged.

Further, a power level is outputted via a power terminal LDVDD of the signal transceiver 10 when the signal transceiver 10 sends a signal via a first signal terminal signal1 and a second signal terminal signal2.

It should be noted that, when a power carrier signal is sent, a level signal of a power transmission part is directly applied via a center tap of the first secondary winding N1 and the second secondary winding N2 to improve a sending efficiency of the signal.

It is further provided a communication system according to the disclosure. The communication system includes the above power carrier signal coupling circuit of which the structure may refer to the above embodiments. Since the communication system adopts all of the technical solutions of the above embodiments, it at least has all advantages of the technical solutions of the above embodiments which are not described herein.

Figure 4:
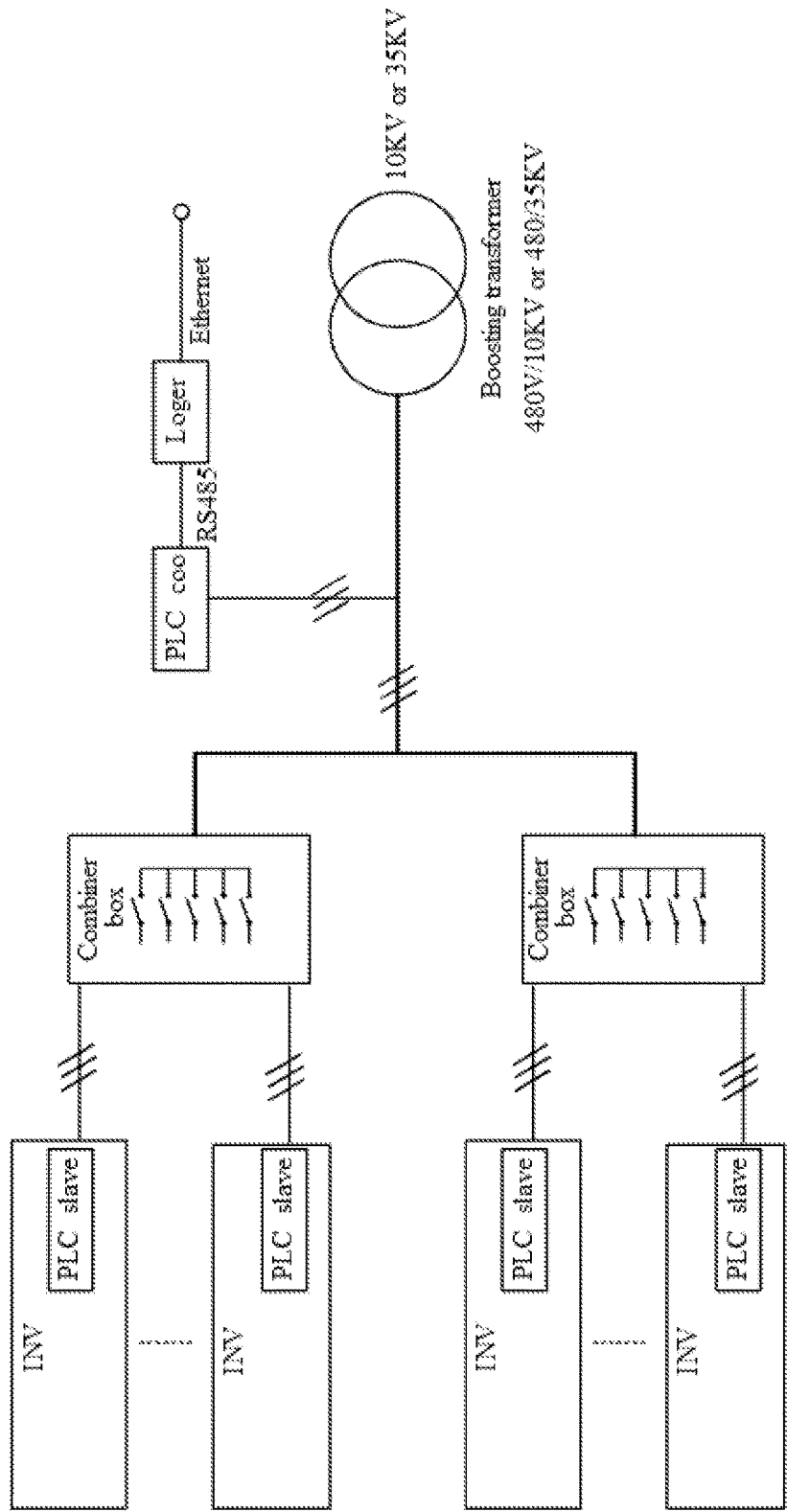
FIG. 4 is a schematic structural diagram of a communication system according to an embodiment of the present disclosure.

In the embodiment, the communication system is applied in a communication with photovoltaic inverter. A structure of an entire power carrier communication system is as shown in FIG. 4. The system includes multiple inverters INV, adopts a power carrier interphase coupling solution with three-phase line without N line, and uses a master-slave architecture including one master node PLC coo and multiple slave nodes PLC slave. The master node and the slave nodes are each arranged with a power carrier signal coupling circuit. Within a transformer range, the master node establishes and maintains a network by receiving power carrier signals sent from any two phases, and accesses to software logger and monitor software via an uplink RS485. The slave node is arranged in each of the photovoltaic inverters, and performs a signal coupling with any two phases of power line. The slave node, after being started, actively searches to access the network established by the master node, thereby communicating with the software logger and the monitor software.

The above embodiments are only preferred embodiments of the present disclosure, and are not intended to limit the scope of the present disclosure. Any equivalent structure transformation made using the specification and drawings of the present disclosure under the concept of the present disclosure, or technical solutions directly/indirectly applying the concept to other related technical fields falls within the scope of protection of the present disclosure.

The invention claimed is:

1. A power carrier signal coupling circuit, connected to a three-phase alternating current (AC) power line, comprising:
   a first power carrier signal coupling channel, comprising a first capacitor;
   a second power carrier signal coupling channel, comprising a second capacitor;
   a signal transceiver; and
   a coupling transformer, comprising a primary winding, a first secondary winding and a second secondary winding, wherein a first terminal of the first secondary winding is connected to the signal transceiver, a second terminal of the first secondary winding is connected to a first terminal of the second secondary winding, and a second terminal of the second secondary winding is connected to the signal transceiver, wherein
   a phase of the three-phase AC power line serves as a common channel,
   the first power carrier signal coupling channel is arranged between the common channel and one of two phases of the three-phase AC power line other than the phase of the three-phase AC power line serving as the common channel,
   the second power carrier signal coupling channel is arranged between the common channel and the other of the two phases of the three-phase AC power line other than the phase of the three-phase AC power line serving as the common channel, and a first terminal of the first capacitor is connected to one of the two phases of the three-phase AC power line other than the phase of the three-phase AC power line serving as the common channel, a second terminal of the first capacitor is connected to a first terminal of the primary winding, a first terminal of the second capacitor is connected to the other of the two phases of the three-phase AC power line other than the phase of the three-phase AC power line serving as the common channel, a second terminal of the second capacitor is connected to the first terminal of the primary winding, and a second terminal of the primary winding is connected to the common channel.

2. The power carrier signal coupling circuit according to claim 1, further comprising a first transient voltage suppressor diode, with an A phase of the three-phase AC power line serving as the common channel, wherein the first power carrier signal coupling channel is arranged between the A phase of the three-phase AC power line and a B phase of the three-phase AC power line, the second power carrier signal coupling channel is arranged between the A phase of the three-phase AC power line and a C phase of the three-phase AC power line, a cathode of the first transient voltage suppressor diode is connected to the A phase of the three-phase AC power line, and an anode of the first transient voltage suppressor diode is connected to the B phase and the C phase of the three-phase AC power line.

3. The power carrier signal coupling circuit according to claim 2, wherein the signal transceiver comprises a bandpass filtering circuit, the bandpass filtering circuit comprises a first resistor, a second resistor, a third capacitor and a fourth capacitor, a first terminal of the third capacitor is connected to the first terminal of the first secondary winding and a second terminal of the third capacitor is grounded via the first resistor, and a second terminal of the fourth capacitor is connected to the second terminal of the second secondary winding and a second terminal of the fourth capacitor is grounded via the second resistor.

4. The power carrier signal coupling circuit according to claim 3, wherein the signal transceiver further comprises a second transient voltage suppressor diode and a third transient voltage suppressor diode, and the signal transceiver further comprises a first signal terminal, a second signal terminal and a power terminal;

the first signal terminal of the signal transceiver is connected to the first terminal of the first secondary winding, the second signal terminal of the signal transceiver is connected to the second terminal of the second secondary winding, and the power terminal of the signal transceiver is connected to a common point between the first secondary winding and the second secondary winding; and a cathode of the second transient voltage suppressor diode is connected to the first signal terminal of the signal transceiver and an anode of the second transient voltage suppressor diode is grounded, and a cathode of the third transient voltage suppressor diode is connected to the second signal terminal of the signal transceiver and an anode of the third transient voltage suppressor diode is grounded.

5. The power carrier signal coupling circuit according to claim 3, wherein, a power level is outputted via a power terminal of the signal transceiver when the signal transceiver sends a signal via a first signal terminal and a second signal terminal.

6. The power carrier signal coupling circuit according to claim 1, further comprising a first transient voltage suppressor diode, with a B phase of the three-phase AC power line serving as the common channel, wherein the first power carrier signal coupling channel is arranged between the B phase of the three-phase AC power line and an A phase of the three-phase AC power line, the second power carrier signal coupling channel is arranged between the B phase of the three-phase AC power line and a C phase of the three-phase AC power line, a cathode of the first transient voltage suppressor diode is connected to the B phase of the three-phase AC power line, and an anode of the first transient voltage suppressor diode is connected to the A phase and the C phase of the three-phase AC power line.

7. The power carrier signal coupling circuit according to claim 1, further comprising a first transient voltage suppressor diode, with a C phase of the three-phase AC power line serving as the common channel, wherein the first power carrier signal coupling channel is arranged between the C phase of the three-phase AC power line and an A phase of the three-phase AC power line, the second power carrier signal coupling channel is arranged between the C phase of the three-phase AC power line and a B phase of the three-phase AC power line, a cathode of the first transient voltage suppressor diode is connected to the C phase of the three-phase AC power line, and an anode of the first transient voltage suppressor diode is connected to the A phase and the B phase of the three-phase AC power line.

8. A communication system, comprising a power carrier signal coupling circuit connected to a three-phase alternating current (AC) power line, wherein the power carrier signal coupling circuit comprises:

a first power carrier signal coupling channel, comprising a first capacitor;

a second power carrier signal coupling channel, comprising a second capacitor;

a signal transceiver; and a coupling transformer, comprising a primary winding, a first secondary winding and a second secondary winding, wherein a first terminal of the first secondary winding is connected to the signal transceiver, a second terminal of the first secondary winding is connected to a first terminal of the second secondary winding, and a second terminal of the second secondary winding is connected to the signal transceiver, wherein a phase of the three-phase AC power line serves as a common channel, the first power carrier signal coupling channel is arranged between the common channel and one of two phases of the three-phase AC power line other than the phase of the three-phase AC power line serving as the common channel, the second power carrier signal coupling channel is arranged between the common channel and the other of the two phases of the three-phase AC power line other than the phase of the three-phase AC power line serving as the common channel, and a first terminal of the first capacitor is connected to one of the two phases of the three-phase AC power line other than the phase of the three-phase AC power line serving as the common channel, a second terminal of the first capacitor is connected to a first terminal of the primary winding, a first terminal of the second capacitor is connected to the other of the two phases of the three-phase AC power line other than the phase of the three-phase AC power line serving as the common channel, a second terminal of the second capacitor is connected to the first terminal of the primary winding, and a second terminal of the primary winding is connected to the common channel.

9. The communication system according to claim 8, wherein the power carrier signal coupling circuit further comprises a first transient voltage suppressor diode, with an A phase of the three-phase AC power line serving as the common channel, wherein the first power carrier signal coupling channel is arranged between the A phase of the three-phase AC power line and a B phase of the three-phase AC power line, the second power carrier signal coupling channel is arranged between the A phase of the three-phase AC power line and a C phase of the three-phase AC power line, a cathode of the first transient voltage suppressor diode is connected to the A phase of the three-phase AC power line, and an anode of the first transient voltage suppressor diode is connected to the B phase and the C phase of the three-phase AC power line.

10. The communication system according to claim 9, wherein the signal transceiver comprises a bandpass filtering circuit, the bandpass filtering circuit comprises a first resistor, a second resistor, a third capacitor and a fourth capacitor, a first terminal of the third capacitor is connected to the first terminal of the first secondary winding and a second terminal of the third capacitor is grounded via the first resistor, and a second terminal of the fourth capacitor is connected to the second terminal of the second secondary winding and a second terminal of the fourth capacitor is grounded via the second resistor.

11. The communication system according to claim 10, wherein the signal transceiver further comprises a second transient voltage suppressor diode and a third transient voltage suppressor diode, and the signal transceiver further comprises a first signal terminal, a second signal terminal and a power terminal;
the first signal terminal of the signal transceiver is connected to the first terminal of the first secondary winding, the second signal terminal of the signal transceiver is connected to the second terminal of the second secondary winding, and the power terminal of the signal transceiver is connected to a common point between the first secondary winding and the second secondary winding; and
a cathode of the second transient voltage suppressor diode is connected to the first signal terminal of the signal transceiver and an anode of the second transient voltage suppressor diode is grounded, and a cathode of the third transient voltage suppressor diode is connected to the second signal terminal of the signal transceiver and an anode of the third transient voltage suppressor diode is grounded.

12. The communication system according to claim 10, wherein, a power level is outputted via a power terminal of the signal transceiver when the signal transceiver sends a signal via a first signal terminal and a second signal terminal.

13. The communication system according to claim 8, wherein the power carrier signal coupling circuit further comprises a first transient voltage suppressor diode, with a B phase of the three-phase AC power line serving as the common channel, wherein the first power carrier signal coupling channel is arranged between the B phase of the three-phase AC power line and an A phase of the three-phase AC power line, the second power carrier signal coupling channel is arranged between the B phase of the three-phase AC power line and a C phase of the three-phase AC power line, a cathode of the first transient voltage suppressor diode is connected to the B phase of the three-phase AC power line, and an anode of the first transient voltage suppressor diode is connected to the A phase and the C phase of the three-phase AC power line.

14. The communication system according to claim 8, wherein the power carrier signal coupling circuit further comprises a first transient voltage suppressor diode, with a C phase of the three-phase AC power line serving as the common channel, wherein the first power carrier signal coupling channel is arranged between the C phase of the three-phase AC power line and an A phase of the three-phase AC power line, the second power carrier signal coupling channel is arranged between the C phase of the three-phase AC power line and a B phase of the three-phase AC power line, a cathode of the first transient voltage suppressor diode is connected to the C phase of the three-phase AC power line, and an anode of the first transient voltage suppressor diode is connected to the A phase and the B phase of the three-phase AC power line.

* * * * *